United States Patent
Varga et al.

(10) Patent No.: US 11,377,142 B2
(45) Date of Patent: Jul. 5, 2022

(54) ELECTROMECHANICAL MOTOR VEHICLE POWER STEERING MECHANISM FOR ASSISTING STEERING OF A MOTOR VEHICLE WITH SAFETY LIMITS FOR TORQUE REQUEST

(71) Applicants: THYSSENKRUPP PRESTA AG, Eschen (LI); thyssenkrupp AG, Essen (DE)

(72) Inventors: Adám Varga, Budapest (HU); Péter Kakas, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 427 days.

(21) Appl. No.: 16/475,248

(22) PCT Filed: Jan. 13, 2017

(86) PCT No.: PCT/EP2017/050677
§ 371 (c)(1),
(2) Date: Jul. 1, 2019

(87) PCT Pub. No.: WO2018/130297
PCT Pub. Date: Jul. 19, 2018

(65) Prior Publication Data
US 2019/0337558 A1 Nov. 7, 2019

(51) Int. Cl.
*B62D 6/00* (2006.01)
*B62D 5/04* (2006.01)

(52) U.S. Cl.
CPC ......... *B62D 5/0484* (2013.01); *B62D 5/0409* (2013.01); *B62D 5/0463* (2013.01)

(58) Field of Classification Search
CPC .. B62D 5/0484; B62D 5/0409; B62D 5/0463; B62D 5/0481; B62D 6/00
(Continued)

(56) References Cited

U.S. PATENT DOCUMENTS

| | | | |
|---|---|---|---|
| 2005/0257987 A1* | 11/2005 | Bohm | B62D 5/06 180/419 |
| 2010/0152952 A1* | 6/2010 | Lee | B62D 1/286 701/31.4 |

(Continued)

FOREIGN PATENT DOCUMENTS

| | | |
|---|---|---|
| CN | 101746412 A | 6/2010 |
| CN | 102574540 A | 7/2012 |

(Continued)

OTHER PUBLICATIONS

International Search Report issued in PCT/EP2017/050677, dated Sep. 5, 2017.

*Primary Examiner* — Shardul D Patel
(74) *Attorney, Agent, or Firm* — thyssenkrupp North America, LLC

(57) ABSTRACT

An electromechanical motor vehicle power steering mechanism for assisting steering of a motor vehicle including an electric motor for steering assist and a torque sensor. The electric motor is configured to apply an assistance torque in response to an output signal from the torque sensor indicative of the input torque applied by a driver of the vehicle to a steering wheel, in which the relationship between the indicated input torque and the assistance torque applied by the motor is defined by a boost curve. A logical summer is used to restrict the relationship between the indicated input torque and the assistance torque within given safety limits.

14 Claims, 4 Drawing Sheets

(58) Field of Classification Search
USPC .......................................................... 701/43
See application file for complete search history.

(56) References Cited

U.S. PATENT DOCUMENTS

| | | | | |
|---|---|---|---|---|
| 2012/0191301 A1* | 7/2012 | Benyo | .................. | B62D 5/0463 |
| | | | | 701/41 |
| 2013/0211676 A1* | 8/2013 | Benyo | .................. | B62D 5/0463 |
| | | | | 701/42 |
| 2018/0281846 A1* | 10/2018 | Schreiner | ............. | B62D 5/0484 |

FOREIGN PATENT DOCUMENTS

| | | | |
|---|---|---|---|
| CN | 102991566 | A | 3/2013 |
| CN | 103153758 | A | 6/2013 |
| DE | 10 2009 048 092 | A | 4/2011 |
| DE | 10 2014 116 235 | A | 5/2016 |
| WO | 2004/005112 | A | 1/2004 |
| WO | 2012/037995 | A | 3/2012 |

\* cited by examiner

ELECTROMECHANICAL MOTOR VEHICLE POWER STEERING MECHANISM FOR ASSISTING STEERING OF A MOTOR VEHICLE WITH SAFETY LIMITS FOR TORQUE REQUEST

CROSS REFERENCE TO RELATED APPLICATIONS

This application is a U.S. National Stage Entry of International Patent Application Serial Number PCT/EP2017/050677, filed Jan. 13, 2017, the entire contents of which are incorporated herein by reference.

FIELD

The present disclosure generally relates to an electromechanical motor vehicle power steering mechanism for assisting steering of a motor vehicle.

BACKGROUND

In an electromechanical motor vehicle power steering mechanism the steering assist force is applied to a steering mechanism by driving an electric motor in accordance with steering torque that is applied to a steering wheel by a driver. An electronic control unit (motor controller) with an inverter controls the motor. The inverter feeds the motor with sinusoidal motor parameters (current, voltage, magnetic flux) according to a torque request for torque generation.

In a steering system of this kind, where torque is generated by an electric motor, it is known to use a 'boost curve', which defines the static relationship between the driver applied input torque and the assistance torque produced by the motor. A feature of a practical boost curve is that there should be a limit on the level of assistance torque which can be applied by the motor. In many systems, this limit is imposed by limitations of the hardware (i.e. maximum torque of the motor). In other systems, the limit may need to be artificially introduced. Where such a limit exists, the boost curve will be flat (i.e. output torque constant) for input torques which would otherwise result in an assistance torque in excess of the limiting value.

Thus a need exists for an electromechanical motor vehicle power steering mechanism that easily and reliably limits a torque request to ensure safe operation of the steering assist.

DETAILED DESCRIPTION

Figure 1:
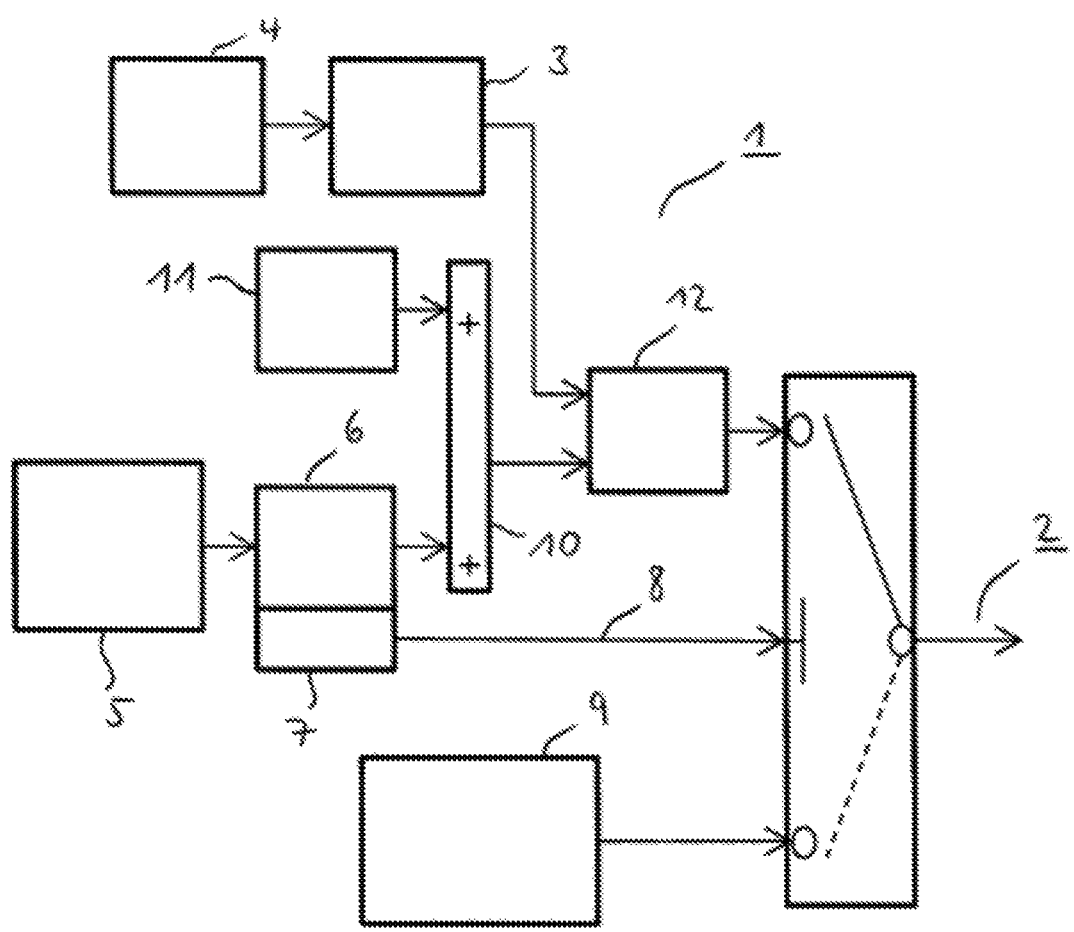
FIG. 1 is a schematic view of a part of a steering controller according to a first aspect of the invention.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electromechanical motor vehicle power steering mechanism for assisting steering of a motor vehicle and a method to limit the assistance torque thereof.

An electromechanical motor vehicle power steering mechanism for assisting steering of a motor vehicle comprising an electric motor for steering assist and a torque sensor, the electric motor being adapted to apply an assistance torque in response to an output signal from the torque sensor indicative of the input torque applied by a driver of the vehicle to a steering wheel, in which the relationship between the indicated input torque and the assistance torque applied by the motor is defined by a boost curve, is provided, wherein a logical summer is used to restrict the relationship between the indicated input torque and the assistance torque within given safety limits. This way the assistance torque can be restricted by limiting the boost curve.

Preferably, a transfer function is used to stabilize the boost curve, wherein the transfer function is input to the logical summer. The logical summer performs a logical sum of the transfer function and the safety limits to keep the assistance torque within a permissible area of the relationship between the indicated input torque and the assistance torque.

In another embodiment the output of the torque controller can be processed with the output of the transfer function, which is arranged downstream of the logical summer, in a limiter, which limits the torque controller output based on the safety limits.

In a preferred embodiment, a diagnostic unit is used to switch the steering assist to a fail-safe mode in case of malfunctioning of the transfer function. The diagnostic unit is part of a proper safety concept.

Preferably, the fail-safe mode comprises a degraded assist resulting in a reduced assistance torque to make sure that a maximum torque of the electric motor is not exceeded. The reduced assistance torque can be zero.

It is further preferred, that a torque controller is present, which is subject to steering algorithms, to actively modify the relationship between the indicated input torque and the assistance torque as defined by the boost curve. The modification can for example create a desired steering feel.

The output of the torque controller can be processed with the output of the logical summer in a limiter, which limits the torque controller output based on the safety limits. This way the limitation limits the relationship between the indicated input torque and the assistance torque beforehand and the result is applied to the output of the torque controller. Preferably, the limiter provides the assistance torque if the steering assist is not switched to fail-safe mode. In this case, it is preferred, that the assistance torque or in fail-safe mode the reduced assistance torque is transmitted to the motor controller of the electric motor.

Preferably, the boost curve is represented by a characteristic which depends only on parameters of the steering mechanism.

It is further advantageous, if the safety limits depend on parameters of the steering mechanism.

The parameters of the steering mechanism can be the driver applied input torque and/or the vehicle speed and/or the turning speed of the steering wheel.

Further, a method to restrict an assistance torque applied by an electric motor for steering assist in an electromechanical motor vehicle power steering mechanism comprising a torque sensor, the electric motor being adapted to apply the assistance torque in response to an output signal from the torque sensor indicative of the input torque applied by a driver of the vehicle to a steering wheel, in which the relationship between the indicated input torque and the assistance torque applied by the motor is defined by a boost curve, is provided, with the following steps:

Restricting the output of the transfer function to an operable range with a logical summer, wherein safety limits are input to the logical summer;

Modifying the output of the logical summer by an output of a torque controller, which is subject to steering algorithms, in a limiter to calculate the assistance torque, which is transmitted to the motor controller of the electric motor.

Preferably, the boost curve is stabilized by a transfer function upstream or downstream of the logical summer. In this case it is preferred, if the method also includes the following step: Checking the output of the transfer function, if a malfunction is detected, switching the assistance torque to a fail safe mode by the use of a diagnostic unit, wherein the fail-safe mode comprises a degraded assist resulting in a reduced assistance torque.

Preferably, the boost curve is represented by a characteristic which depends on parameters of the steering mechanism, wherein the parameters of the steering mechanism are the driver applied input torque and/or the vehicle speed and/or the turning speed of the steering wheel.

Preferably, the safety limits depend on parameters of the steering mechanism, wherein the parameters of the steering mechanism are the driver applied input torque and/or the vehicle speed and/or the turning speed of the steering wheel.

The steering mechanism is preferably of column assist type.

In an electromechanical power steering mechanism a steering shaft is connected to a steering wheel for operation by the driver. The steering shaft is coupled to a steering rack via a gear pinion. Steering rack rods are connected to the steering rack and to steered wheels of the motor vehicle. A rotation of the steering shaft causes an axial displacement of the steering rack by means of the gear pinion which is connected to the steering shaft in a torque-proof manner. Electric power assist is provided through a steering controller 1 and a power assist actuator comprising the electric motor and a motor controller 2. The steering controller 1 receives signals representative of the vehicle velocity and the torque applied to the steering wheel by the vehicle operator. In response to the vehicle velocity, the operator torque and the rotor position signal detected by a rotor position sensor, the controller 1 determines the target motor torque and provides the signal through to the motor controller 2, where the motor currents are calculated via PWM (pulse-width modulation). A torque controller 3 is part of the steering controller 1. Steering algorithms 4 create an input to the torque controller 3. These steering algorithms 4 influence for example the steering feel of the driver. They can include for example, damping, active return, pull drift and likewise functions.

A boost curve 5 gives the relationship between input torque and the assistance torque. The boost curve 5 is a look-up table and represented by a simple characteristic which depends on steering systems states e.g. input torque (measured and/or estimated) and/or vehicle speed (measured and/or estimated). A transfer function 6 is needed to stabilize the boost curve 5 at unstable points at certain gain values. A diagnostic unit 7 reviews the transfer function outputs. If a malfunction of the transfer function 6 occurs, the diagnostic unit 7 switches the steering assist to fail safe operation mode 8 and a basic degraded assist 9 is available. The degraded assist 9 provides an assistance motor torque through to the motor controller 2. This assistance motor torque can be zero. If no error occurs the output of the transfer function 6 is inputted into a logical summer 10. The summer 10 summarizes the transfer function 7 output(s) and safety limits 11. The base function of the summer 10 is the transfer function 6, which is limited to a permissible area by adding upper and lower limits 11 (safety limits). The result of the summer 10 forms an input to a limiter 12 which limits the torque controller signal to a permissible area and ensures that uncontrollable motor torque requests can not be provided by the torque controller and steering algorithms. This way the signal from the controller 3 can not be higher than the upper limit from the summer 10 and can not be lower than the lower limit from the summer. If the signal from the controller 3 exceeds these values, it is set to the maximum/minimum value within the permissible area.

Thus, the torque controller signal is transferred with the help of the limiter 12 to an assistance motor torque, which is provided through to the motor controller 2.

The diagnostic's fail safe operation mode 8 makes the limiter Automotive Safety Integrity Level D (ASIL D) compliant.

The safety limits 11 of the limiter 10 can depend on steering system states e.g. driver applied input torque (measured and/or estimated) and/or vehicle speed and/or turning speed of the steering wheel (measured and/or estimated). It is possible that only 1 or 2 of the above mentioned steering system states are used. For example only the driver applied input torque or only the driver applied input torque and the vehicle speed. The electromechanical power steering mechanism can be a column assist or rack assist type. Rack assist EPAS systems have an electric motor that is connected to the steering rack. The electric motor assists the rack movement usually through driving a lead screw mechanism. Column assist EPAS systems have an electric motor connected to the steering column. The electric motor assists the movement of the column shaft usually through a worm gear type arrangement.

Figure 2:
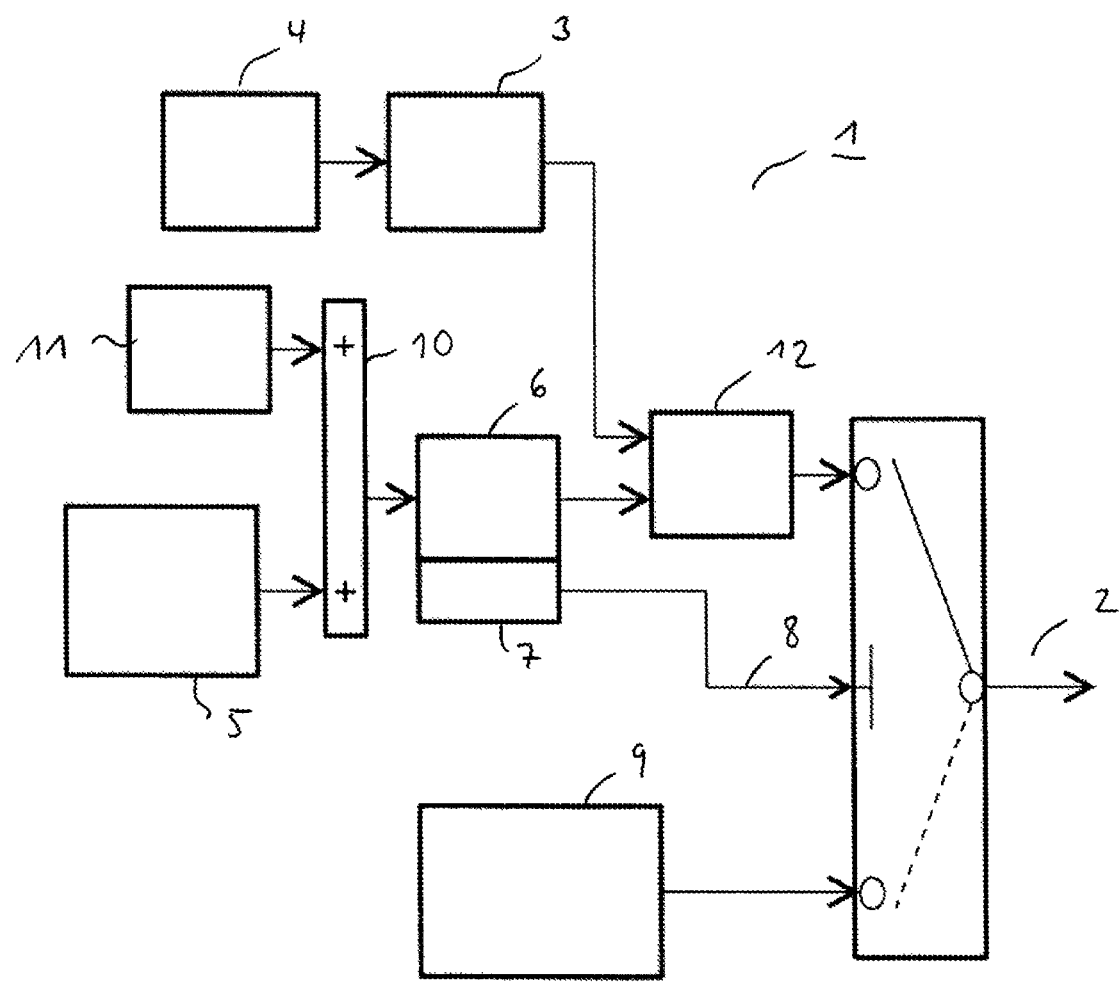
FIG. 2 is a schematic view of a part of a steering controller according to a first aspect of the invention.

In contrast to the embodiment shown in FIG. 1, in FIG. 2 the safety limits 11 are applied directly to the look-up table of the boost curve in the summer 10. The output of the summer 10 is input to the transfer function 6 with the diagnostic unit 7. If the transfer function 6 is working correctly and malfunction cannot be detected, the output of the transfer function 6 is input to the limiter 12. Otherwise the fail-safe mode is activated via the diagnostic unit 7. The safety limits and the limiter are working in the same way as explained with respect to FIG. 1.

Figure 3:
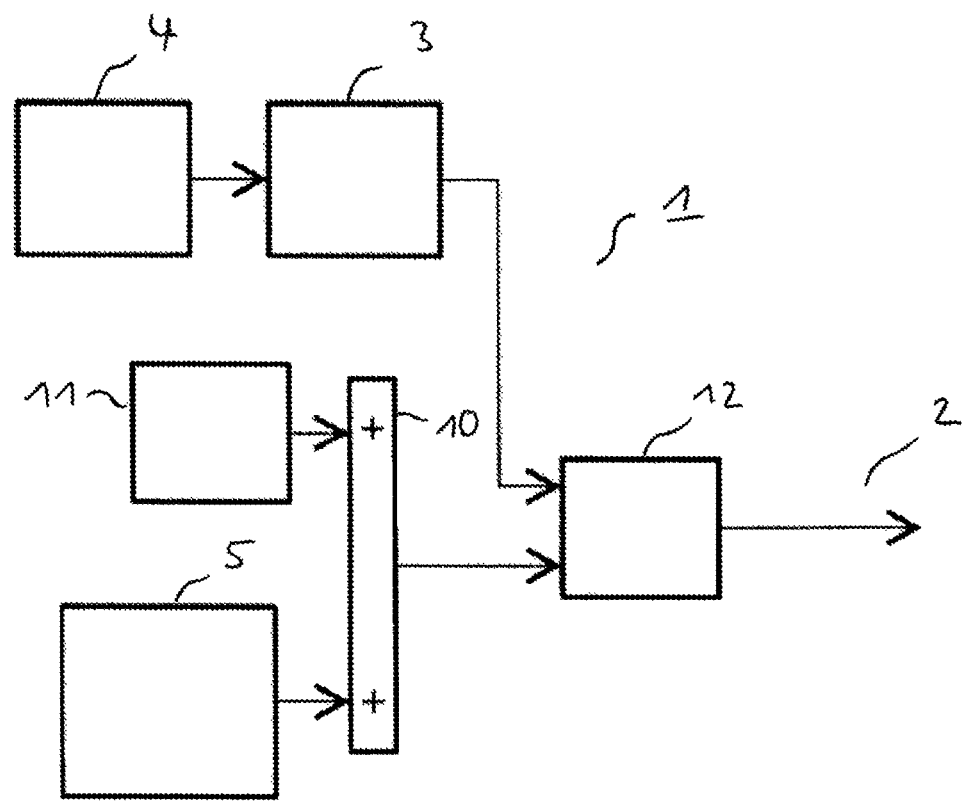
FIG. 3 is a schematic view of a part of a steering controller according to a first aspect of the invention.

FIG. 3 shows a third embodiment of the invention, which is essentially the same as shown in FIG. 2, except that neither a transfer function nor a diagnostic unit is present. The safety limits 11 are applied directly to the look-up table of the boost curve in the summer 10. The output of the summer 10 is input to the limiter 12. The limiter 12 provides the signal through to the motor controller 2, where the motor currents are calculated via PWM (pulse-width modulation).

Figure 4:
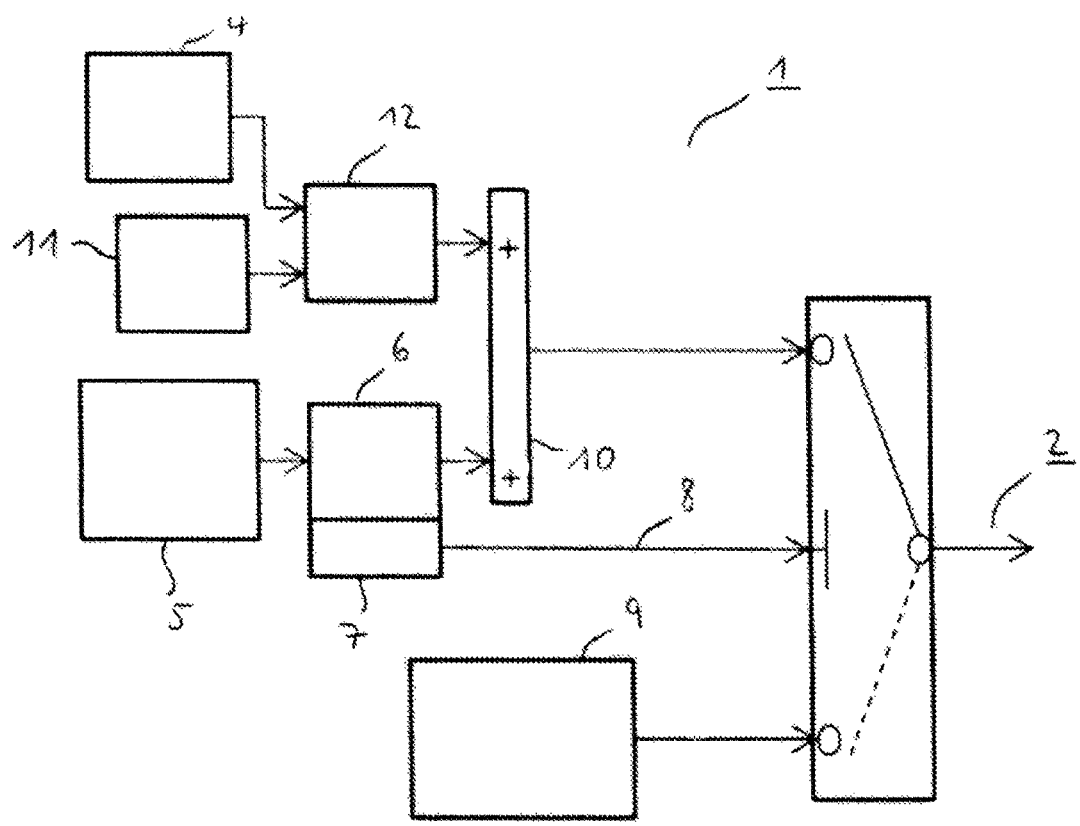
FIG. 4 is a schematic view of a part of a steering controller according to a first aspect of the invention.

FIG. 4 shows a fourth embodiment of the invention, which is essentially the same as shown in FIG. 1, except that a torque controller is not present and that the output of the limiter 12 is input of the summer 10. The safety limits 11 are applied to the limiter 12 in addition to the output of the steering algorithm 4. Thus the limiter directly limits the output of the steering algorithm 4, which is then used as input for the summer 10 and limitation to a permissible area for the transfer function 6.

The invention claimed is:

1. An electromechanical motor vehicle power steering mechanism for assisting steering of a motor vehicle, comprising: an electric motor configured to produce a steering assist, a torque sensor configured to detect input torque from a driver to a steering wheel operatively attached to the motor vehicle power steering mechanism, wherein the electric motor is configured to generate an assistance torque in response to an output signal from the torque sensor indicative of the input torque, in which the relationship between the indicated input torque and the assistance torque generated by the motor is defined by a boost curve, a logical summer configured to restrict the relationship between the indicated input torque and the assistance torque within selected safety limits, a transfer function used to stabilize the boost curve, wherein the transfer function is the base function of the logical summer, and a diagnostic unit used to switch the steering assist to a fail-safe mode in case of a malfunction of the transfer function, wherein the fail-safe mode comprises a degraded assist resulting in a reduced assistance torque.

2. The electromechanical motor vehicle power steering mechanism of claim 1 wherein the reduced assistance torque is zero.

3. The electromechanical motor vehicle power steering mechanism of claim 1, comprising a torque controller, which is subject to steering algorithms, to actively modify the relationship between the indicated input torque and the assistance torque as defined by the boost curve.

4. The electromechanical motor vehicle power steering mechanism of claim 3, wherein the output of the torque controller is processed with the output of the logical summer in a limiter, which limits the torque controller output based on the safety limits.

5. The electromechanical motor vehicle power steering mechanism of claim 3, wherein the output of the torque controller is processed with the output of the transfer function, which is arranged downstream of the logical summer, in a limiter, which limits the torque controller output based on the safety limits.

6. The electromechanical motor vehicle power steering mechanism of claim 3, wherein a limiter provides the assistance torque when the steering assist is not switched to fail-safe mode.

7. The electromechanical motor vehicle power steering mechanism of claim 6, wherein the assistance torque or in fail-safe mode the reduced assistance torque is transmitted to a motor controller of the electric motor.

8. The electromechanical motor vehicle power steering mechanism of claim 1, wherein the boost curve is represented by a characteristic which depends only on parameters of the steering mechanism.

9. The electromechanical motor vehicle power steering mechanism of claim 8, wherein the parameters of the steering mechanism are one or more of the driver applied input torque or a vehicle speed or a turning speed of the steering wheel.

10. The electromechanical motor vehicle power steeling mechanism of claim 1, wherein the safety limits depend on parameters of the steering mechanism.

11. The electromechanical motor vehicle power steeling mechanism of claim 1, wherein the steering mechanism is of a column assist type.

12. A method to restrict an assistance torque applied by an electric motor configured to generate a steering assist in an electromechanical motor vehicle power steering mechanism comprising a torque sensor, the electric motor being configured to generate the assistance torque in response to an output signal from the torque sensor indicative of an input torque applied by a driver of the vehicle to a steering wheel, in which the relationship between the indicated input torque and the assistance torque generated by the motor is defined by a boost curve, wherein the method comprises the following steps: restricting the boost curve to an operable range with a logical summer, wherein safety limits are input to the logical summer; modifying the output of the logical summer by an output of a torque controller, which is subject to steering algorithms, in a limiter to calculate the assistance torque; transmitting the calculated assistance torque to the motor controller of the electric motor; stabilizing the boost curve by a transfer function before or after the logical summer; checking the output of the transfer function; and when a malfunction is detected, switching the assistance torque to a fail-safe mode by the use of a diagnostic unit, wherein the fail-safe mode comprises a degraded assist resulting in a reduced assistance torque.

13. The method of claim 12, wherein the boost curve is represented by a characteristic which depends on parameters of the steering mechanism, wherein the parameters of the steering mechanism are one or more of the driver applied input torque, or a vehicle speed, or a turning speed of the steering wheel.

14. The method of claim 12, wherein the safety limits depend on parameters of the steering mechanism, wherein the parameters of the steering mechanism are one or more of the driver applied input torque, or a vehicle speed, or a turning speed of the steering wheel.

* * * * *